(12) United States Patent
Kourtakis et al.

(10) Patent No.: US 11,104,801 B2
(45) Date of Patent: Aug. 31, 2021

(54) LOW HAZE POLYIMIDE FILM

(71) Applicant: DUPONT ELECTRONICS, INC., Wilmington, DE (US)

(72) Inventors: Kostantinos Kourtakis, Media, PA (US); Gene M Rossi, Wilmington, DE (US); Peggy Scott, Circleville, OH (US)

(73) Assignee: DUPONT ELECTRONICS, INC.

( * ) Notice: Subject to any disclaimer, the term of this patent is extended or adjusted under 35 U.S.C. 154(b) by 0 days.

(21) Appl. No.: 16/277,081

(22) Filed: Feb. 15, 2019

(65) Prior Publication Data

US 2019/0276669 A1 Sep. 12, 2019

Related U.S. Application Data

(60) Provisional application No. 62/640,874, filed on Mar. 9, 2018.

(51) Int. Cl.
| | |
|---|---|
| *C08L 79/08* | (2006.01) |
| *C08K 5/00* | (2006.01) |
| *C08K 5/357* | (2006.01) |
| *C08K 5/3437* | (2006.01) |
| *C08G 73/10* | (2006.01) |
| *C09D 179/08* | (2006.01) |

(52) U.S. Cl.
CPC .......... *C08L 79/08* (2013.01); *C08G 73/1039* (2013.01); *C08G 73/1042* (2013.01); *C08G 73/1067* (2013.01); *C08K 5/0041* (2013.01); *C08K 5/3437* (2013.01); *C08K 5/357* (2013.01); *C09D 179/08* (2013.01); *C08G 73/1053* (2013.01); *C08L 2203/16* (2013.01); *C08L 2203/20* (2013.01)

(58) Field of Classification Search
CPC .... C08K 5/0041; C08L 2203/16; C08L 79/08
See application file for complete search history.

(56) References Cited

U.S. PATENT DOCUMENTS

| | | | |
|---|---|---|---|
| 3,410,826 A | 11/1968 | Endrey | |
| 5,166,308 A | 11/1992 | Kreuz et al. | |
| 5,298,331 A | 3/1994 | Kanakarajan et al. | |
| 9,303,136 B2 * | 4/2016 | Becks | C08K 3/22 |
| 2015/0030845 A1 * | 1/2015 | Carney | C08K 5/3417 |
| | | | 428/329 |
| 2017/0190880 A1 | 7/2017 | Jo et al. | |

* cited by examiner

*Primary Examiner* — Wenwen Cai

(57) ABSTRACT

In a first aspect, a low haze polyimide film includes, a dianhydride, a diamine, and a color-tuning compound. The low haze polyimide film has a thickness in a range of from 1 to 150 um, an a* closer to zero with a |Δa*| greater than 0.2 and a b* that is at most 0.2 further away from zero, or a b* closer to zero with a |Δb*| greater than 0.2 and an a* that is at most 0.2 further away from zero, when compared to a low haze polyimide film of the same dianhydride and diamine composition, but without the color-tuning compound, and a haze of less than 4%. In a second aspect, an electronic device includes the low haze polyimide film of the first aspect.

10 Claims, No Drawings

LOW HAZE POLYIMIDE FILM

FIELD OF DISCLOSURE

The field of this disclosure is low haze polyimide films.

BACKGROUND OF THE DISCLOSURE

Low haze polyimide films can potentially replace rigid glass cover sheets and other substrates which are currently used in display applications, such as organic light-emitting diode (OLED) displays. Polyimides are typically very thermally stable, with glass transition temperatures ($T_g$) of greater than 320° C., and have excellent foldability and rollability, a critical property needed for next-generation flexible displays. For polyimide films used in display applications, in addition to having high transmittance and low haze, the polyimide film also needs to be neutral in color. Typical specifications require that both a* and b* are no greater than 1 color unit from neutral (0) in CIE L*, a*, b* color space coordinates, i.e., the absolute values of a* and b* should be less than 1. The three coordinates of CIE L*, a*, b* represent: (1) the lightness of the color (L*=0 yields black and L*=100 indicates diffuse white), (2) its position between red/magenta and green (negative a* values indicate green, while positive values indicate magenta) and (3) its position between yellow and blue (negative b* values indicate blue and positive values indicate yellow).

Typical polyimides with fluorinated monomers, which are nearly colorless, still absorb light in the blue or violet wavelengths (400-450 nm) which gives the films a yellow appearance in transmission. The color of the polyimide films is mostly generated from charge transfer absorptions arising from HOMO-LUMO transitions which can occur both within the polymer chains and between polymer chains. Various approaches have been used to alter HOMO-LUMO transition energies or to frustrate interchain interactions. In one approach, a fluorinated monomer is used to alter the HOMO-LUMO transition energies of the polyimide polymer, but still some residual yellow color can be apparent in these polyimide films. Depending on the monomer composition in the polyimide, therefore, b* can be higher than 1. Since the CIE L*, a*, b* color measurement of a film is also dependent on its thickness, achieving a neutral appearance is even more difficult for thicker films, such as those greater than 25 µm, which is the typical thickness for a flexible cover sheet assembly for an OLED display.

In another approach to reducing yellowness, a compound having a maximum absorption wavelength of about 570 nm or more in a visible radiation region may be included in a polyimide film (see U.S. Patent Application Publication No. 2017/0190880 A1), such as a blue pigment or a violet pigment, to effectively counterbalance the absorption of the polyimide and reduce the yellow appearance of these films.

SUMMARY

In a first aspect, a low haze polyimide film includes, a dianhydride, a diamine, and a color-tuning compound. The low haze polyimide film has a thickness in a range of from 1 to 150 µm, an a* closer to zero with a |Δa*| greater than 0.2 and a b* that is at most 0.2 further away from zero, or a b* closer to zero with a |Δb*| greater than 0.2 and an a* that is at most 0.2 further away from zero, when compared to a low haze polyimide film of the same dianhydride and diamine composition, but without the color-tuning compound, and a haze of less than 4%.

In a second aspect, an electronic device includes the low haze polyimide film of the first aspect.

The foregoing general description and the following detailed description are exemplary and explanatory only and are not restrictive of the invention, as defined in the appended claims.

DETAILED DESCRIPTION

In a first aspect, a low haze polyimide film includes, a dianhydride, a diamine, and a color-tuning compound. The low haze polyimide film has a thickness in a range of from 1 to 150 µm, an a* closer to zero with a |Δa*| greater than 0.2 and a b* that is at most 0.2 further away from zero, or a b* closer to zero with a |Δb*| greater than 0.2 and an a* that is at most 0.2 further away from zero, when compared to a low haze polyimide film of the same dianhydride and diamine composition, but without the color-tuning compound, and a haze of less than 4%.

In one embodiment of the first aspect, the dianhydride is selected from the group consisting of 3,3',4,4'-biphenyl tetracarboxylic dianhydride, pyromellitic dianhydride, cyclobutane dianhydride, 4,4'-(hexafluoroisopropylidene) diphthalic anhydride and mixtures thereof.

In another embodiment of the first aspect, the dianhydride includes a fluorinated dianhydride. In a specific embodiment, the fluorinated dianhydride includes 4,4'-(hexafluoroisopropylidene)diphthalic anhydride.

In yet another embodiment of the first aspect, the diamine includes a fluorinated diamine. In a specific embodiment, the fluorinated diamine includes 2,2'-bis(trifluoromethyl) benzidine.

In still another embodiment of the first aspect, the color-tuning compound is selected from the group consisting of perylenes, dioxazines, triarylmethanes and mixtures thereof. In a specific embodiment, the perylene is pigment violet 29. In another specific embodiment, the dioxazine includes a carbazole dioxazine. In a more specific embodiment, the carbazole dioxazine is pigment violet 23.

In a further embodiment of the first aspect, the low haze polyimide film has an L* of greater than 90.

In yet a further embodiment of the first aspect, the low haze polyimide film has a thickness in a range of from 5 to 125 µm.

In still a further embodiment of the first aspect, the color-tuning compound is present in the low haze polyimide film in an amount in the range of from 5 to 500 ppm.

In a second aspect, an electronic device includes the low haze polyimide film of the first aspect.

In one embodiment of the second aspect, the low haze polyimide film is used in device components selected from the group consisting of device substrates, substrates for color filter sheets, cover sheets, and touch sensor panels. In a specific embodiment, the cover sheet further includes a hard coat layer, an anti-reflection layer, or both a hard coat layer and anti-reflection layer.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Depending upon context, "diamine" as used herein is intended to mean: (i) the unreacted form (i.e., a diamine monomer); (ii) a partially reacted form (i.e., the portion or portions of an oligomer or other polyimide precursor derived from or otherwise attributable to diamine monomer) or (iii) a fully reacted form (the portion or portions of the polyimide derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate polyamic acid (which can then be cured into a polyimide). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polyimide composition reacted from or otherwise attributable to dianhydride monomer) or (iii) a fully reacted form (the portion or portions of the polyimide derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polyimide). Such additional anhydride moieties could be used to crosslink the polymer or to provide other functionality to the polymer.

Any one of a number of polyimide manufacturing processes may be used to prepare low haze polyimide films. It would be impossible to discuss or describe all possible polyimide manufacturing processes useful in the practice of the present invention. It should be appreciated that the monomer systems of the present invention are capable of providing the above-described advantageous properties in a variety of manufacturing processes. The compositions of the present invention can be manufactured as described herein and can be readily manufactured in any one of many (perhaps countless) ways of those of ordinarily skilled in the art, using any conventional or non-conventional polyimide manufacturing technology.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the polyimides of the present invention are preferably capable of dissolving the polyimide precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred.

Solvents of the present invention may be used alone or in combination with other solvents (i.e., cosolvents). Useful organic solvents include: N-methylpyrrolidone (NMP), dimethylacetamide (DMAc), N,N'-dimethyl-formamide (DMF), dimethyl sulfoxide (DMSO), tetramethyl urea (TMU), diethyleneglycol diethyl ether, 1,2-dimethoxyethane (monoglyme), diethylene glycol dimethyl ether (diglyme), 1,2-bis-(2-methoxyethoxy) ethane (triglyme), bis [2-(2-methoxyethoxy) ethyl)] ether (tetraglyme), gamma-butyrolactone, and bis-(2-methoxyethyl) ether, tetrahydrofuran. In one embodiment, preferred solvents include N-methylpyrrolidone (NMP) and dimethylacetamide (DMAc).

Co-solvents can generally be used at about 5 to 50 weight percent of the total solvent, and useful such co-solvents include xylene, toluene, benzene, "Cellosolve" (glycol ethyl ether), and "Cellosolve acetate" (hydroxyethyl acetate glycol monoacetate).

Diamines

In one embodiment, any number of suitable diamines can be used in forming the low haze polyimide film, including p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene, 2,4,6-trimethyl-1,3-diaminobenzene, In one embodiment, a suitable diamine for forming the low haze polyimide film can include a fluorinated diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9.9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl) benzene amine], 4,4'-thio-bis-[(2-trifluoromethyl)benzene-amine], 4,4'-thiobis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-diamino-4-methyl-2',3',5',6'-tetrafluoro-4'-trifluoromethyldiphenyloxide, 2,2-Bis[4'(4"-aminophenoxy) phenyl]phthalein-3',5'-bis(trifluoromethyl)anilide (6FADAP) and 3,3',5,5'-tetrafluoro-4,4'-diamino-diphenyl-methane (TFDAM). In a specific embodiment, the fluorinated diamine is 2,2'-bis(trifluoromethyl) benzidine (TFMB).

Dianhydrides

In one embodiment, any number of suitable dianhydrides can be used in forming the low haze polyimide film. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyl tetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyl tetracarboxylic dianhydride, 2,3,3',4'-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride, thiophene-2,3,4,5-tetracarboxylic dianhydride and cyclobutane dianhydride (CBDA).

In one embodiment, a suitable dianhydride for forming the low haze polyimide film can include a fluorinated dianhydride, such as 4,4'-(hexafluoroisopropylidene)diphthalic anhydride (6FDA) and 5,5-[2,2,2]-trifluoro-1-(trifluoromethyl)ethylidene. In a specific embodiment, the fluorinated dianhydride is 4,4'-(hexafluoroisopropylidene) diphthalic anhydride (6FDA).

Color-Tuning Compounds

In one embodiment, color-tuning compounds according to the present invention can be perylenes, dioxazines, triarylmethanes, anthracenes and mixtures thereof. In one embodiment, a color-tuning compound that may be a dioxazine is a carbazole dioxazine. These color-tuning compounds, in the perylene, carbazole dioxazine, dioxazine, triarylmethane and anthracene families, can compensate for the blue-violet absorption of the polyimide by absorbing light between approximately 530 and 640 nm (i.e., having at least one absorption peak between approximately 530 and 640 nm), including the yellow wavelength region of approximately 570 to 590 nm. Surprisingly, these color-tuning compounds are compatible with polyamic acid and the relatively high temperature processing (typically >300° C.) in air or an inert atmosphere which is used to convert a polyamic film to a polyimide film. They are also, surprisingly, sufficiently hydrolytically stable to remain effective after an imidization process which eliminates water for ring closure during imide formation. By comparison, other thermally stable compounds, with the desired blue-violet absorption between 530 and 640 nm, cannot accurately color compensate for the yellow appearance of polyimide films.

In one embodiment, a color-tuning compound that is a perylene can can be pigment violet 29 (a derivate of perylene, $C_{24}H_{10}N_2O_4$). In one embodiment, a color-tuning compound that is a dioxazine can be pigment violet 23 (9,19-dichloro-5,15-diethyl-5,15-dihydrodiindolo[2,3-c:2', 3'-n]triphenodioxazine, a dioxazine violet compound derived from a carbazole) or pigment violet 37. In one embodiment, a color-tuning compound that is a triarylmethane can be pigment violet 4, pigment violet 27, or a methyl violet compound, such as methyl violet 10B (crystal violet, or hexamethyl pararosaniline chloride), methyl violet 2B (N-(4-(bis(4(dimethylamino)phenyl)methylene)cyclohexa-2,5-dien-1-ylidene)methanaminium chloride), or methyl violet 6B. In one embodiment, a color-tuning compound that is an anthracene can be solvent violet 31, which is an anthraquinone (1,4-diamino-2,3-dichloroanthracene-9,10-dione). In one embodiment, a color-tuning compound can be pigment violet 31 (dichloroviolanthrone).

In one embodiment, a combination of color-tuning compounds may be used. For example, a red compound may be combined with a blue compound, such that the "composite color" of the two compounds is in the violet region. Those skilled in the art will appreciated that any number of color-tuning compounds can be combined to achieve the desired spectral properties, and that all of the compounds need to be thermally stable at the processing temperatures of the polyimide film.

The ability of color-tuning compounds to absorb light can be affected by not only the chemistry of the color-tuning compounds, but also their physical properties, such as particle size and morphology. Those skilled in the art will appreciate that modifications to the color-tuning compounds' physical properties may be needed to achieve the desired properties of a low haze polyimide film.

In one embodiment, the color-tuning compound can be used to produce a film which has an a* closer to zero with an absolute value of the change in a* (|Δa*|) greater than 0.2 and a b* that is at most 0.2 further away from zero, or a b* closer to zero with an absolute value of the change in b* (|Δb*|) greater than 0.2 and an a* that is at most 0.2 further away from zero, when compared to a low haze polyimide film of the same dianhydride and diamine composition, but without the color-tuning compound. In other words, at least one of the color coordinates has shifted to a more neutral color (towards zero) and the absolute value of the change in a* or b* is greater than 0.2. For instance, a low haze polyimide film may have an a* of −1 without the color-tuning compound and has an a* of greater than −0.8 after adding the color-tuning compound, or a low haze polyimide film may have a b* of 1.5 without the color-tuning compound and has a b* of less than 1.3 after adding the color-tuning compound.

In one embodiment, the amount of color-tuning compound in a low haze polyimide film is in a range of from 5 to 500 ppm, or 10 to 300 ppm, or 20 to 200 ppm.

Low Haze Polyimide Films

Low haze polyimide film layers according to the present invention can be produced by combining the diamine and dianhydride (monomer or other polyimide precursor form) together with a solvent to form a polyamic acid (also called a polyamide acid) solution. The dianhydride and diamine can be combined in a molar ratio of about 0.90 to 1.10. The molecular weight of the polyamic acid formed therefrom can be adjusted by adjusting the molar ratio of the dianhydride and diamine. Haze is defined in transmission by collecting forward scattered light using the method described by ASTM1003, and measures the amount of light which deviates from the incident beam by more than 2.5 degrees on average. In one embodiment, a low haze polyimide film has a haze of less than 4%, or less than 2%, or less than 1%.

In one embodiment, a polyamic acid casting solution is derived from the polyamic acid solution. The polyamic acid casting solution preferably comprises the polyamic acid solution can optionally be combined with conversion chemicals like: (i.) one or more dehydrating agents, such as, aliphatic acid anhydrides (acetic anhydride, etc.) and/or aromatic acid anhydrides; and (ii.) one or more catalysts, such as, aliphatic tertiary amines (triethyl amine, etc.), aromatic tertiary amines (dimethyl aniline, etc.) and heterocyclic tertiary amines (pyridine, picoline, isoquinoline, etc.). The anhydride dehydrating material it is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used.

In one embodiment, the polyamic acid solution, and/or the polyamic acid casting solution, is dissolved in an organic solvent at a concentration from about 5.0 or 10% to about 15, 20, 25, 30, 35 and 40% by weight.

In one embodiment, the color-tuning compound is a soluble or well-dispersed (predominantly sub 1000 nm, or predominantly sub 500 nm, in effective diameter) organic compound, which is compatible with the polyamic acid, and which can survive the high-temperature processing of the polyimide.

The polyamic acid (and casting solution) can further comprise any one of a number of additives, such as processing aids (e.g., oligomers), antioxidants, light stabilizers, flame retardant additives, anti-static agents, heat stabilizers, ultraviolet absorbing agents, inorganic fillers or various reinforcing agents. These inorganic fillers include thermally conductive fillers, like metal oxides, inorganic nitrides and metal carbides, and electrically conductive fillers like metals, graphitic carbon and carbon fibers, and electrically conductive polymers. Common inorganic fillers are alumina, silica, silicon carbide, diamond, clay, boron nitride, aluminum nitride, titanium dioxide, dicalcium phosphate, and fumed metal oxides. Common organic fillers include polyaniline, polythiophene, polypyrrole, polyphenylenevinylene, polydialkylfluorenes, carbon black, graphite, multi-walled and single walled carbon nanotubes and carbon nanofibers.

The solvated mixture (the polyamic acid casting solution) can then be cast or applied onto a support, such as an endless belt or rotating drum, to give a film. Next, the solvent containing-film can be converted into a self-supporting film by heating at an appropriate temperature (thermal curing) together with conversion chemical reactants (chemical curing). The film can then be separated from the support, oriented such as by tentering, with continued thermal and chemical curing to provide a polyimide film.

Useful methods for producing low haze polyimide film in accordance with the present invention can be found in U.S. Pat. Nos. 5,166,308 and 5,298,331 are incorporate by reference into this specification for all teachings therein. Numerous variations are also possible, such as, (a.) A method wherein the diamine components and dianhydride components are preliminarily mixed together and then the mixture is added in portions to a solvent while stirring.

(b.) A method wherein a solvent is added to a stirring mixture of diamine and dianhydride components. (contrary to (a) above)

(c.) A method wherein diamines are exclusively dissolved in a solvent and then dianhydrides are added thereto at such a ratio as allowing to control the reaction rate.

(d.) A method wherein the dianhydride components are exclusively dissolved in a solvent and then amine components are added thereto at such a ratio to allow control of the reaction rate.

(e.) A method wherein the diamine components and the dianhydride components are separately dissolved in solvents and then these solutions are mixed in a reactor.

(f.) A method wherein the polyamic acid with excessive amine component and another polyamic acid with excessive dianhydride component are preliminarily formed and then reacted with each other in a reactor, particularly in such a way as to create a non-random or block copolymer.

(g.) A method wherein a specific portion of the amine components and the dianhydride components are first reacted and then the residual diamine components are reacted, or vice versa.

(h.) A method wherein the conversion chemicals are mixed with the polyamic acid to form a polyamic acid casting solution and then cast to form a gel film.

(i.) A method wherein the components are added in part or in whole in any order to either part or whole of the solvent, also where part or all of any component can be added as a solution in part or all of the solvent.

(j.) A method of first reacting one of the dianhydride components with one of the diamine components giving a first polyamic acid. Then reacting the other dianhydride component with the other amine component to give a second polyamic acid. Then combining the amic acids in any one of a number of ways prior to film formation.

In one embodiment, if the polyimide is soluble in a non-protic solvent, such as DMAc or NMP, the polyimide can be formed in solution, optionally with the addition of catalysts at higher temperatures (>50° C.). After filtration, the polyimide powder can be re-dissolved in a solvent. The polyimide solution can then be cast onto a support (e.g. a moving belt or rigid support) and coalesced to create a polyimide film.

The thickness of the polyimide film may be adjusted, depending on the intended purpose of the film or final application specifications. In one embodiment, the low haze polyimide film has a total thickness in a range of from 1 to 150 μm, or from 5 to 125 μm, or from 10 to 75 μm, or from 20 to 50 μm.

In one embodiment, the polyamic acid can be solution cast. The cast solution forms an uncured polyamic acid film that is later cured to a polyimide. In one embodiments, the polyimide film is prepared by casting from a slot die onto a moving stainless steel belt. In one embodiment, the belt is then passed through a convective oven, to evaporate solvent and partially imidize the polymer, to produce a "green" film. The green film can be stripped off the casting belt and wound up. The green film can then be passed through a tenter oven to produce a fully cured polyimide film. In some embodiments, during tentering, shrinkage can be minimized by constraining the film along the edges (i.e. using clips or pins).

The term "gel film" refers to a polyamic acid sheet, which is laden with volatiles, primarily solvent, to such an extent that the polyamic acid is in a gel-swollen, or rubbery condition, and may be formed in a chemical conversion process. The volatile content is usually in the range of 70 to 90% by weight and the polymer content usually in the range of 10 to 30% by weight of the gel film. The final film becomes "self-supporting" in the gel film stage. It can be stripped from the support on which it was cast and heated to a final curing temperature. The gel film generally has an amic acid to imide ratio between 10:90 and 50:50, most often 30:70.

The gel film structure can be prepared by the method described in U.S. Pat. No. 3,410,826. This patent discloses mixing a chemical converting agent and a catalyst such as a lower fatty acid anhydride and a tertiary amine, into the polyamic-acid solution at a low temperature. This is followed by casting the polyamic-acid solution in film-form, onto a casting drum. The film is mildly heated after casting, at for example 100° C., to activate the conversion agent and catalyst in order to transform the cast film to a polyamic acid/polyimide gel film.

Another type of polyimide base film, is a "green film" which is partially polyamic acid and partially polyimide, and may be formed in a thermal conversion process. Green film contains generally about 50 to 75% by weight polymer and 25 to 50% by weight solvent. Generally, it should be sufficiently strong to be substantially self-supporting. Green film can be prepared by casting the polyamic acid solution into film form onto a suitable support such as a casting drum or belt and removing the solvent by mild heating at up to 150° C. A low proportion of amic acid units in the polymer may be converted to imide units.

Applications

In one embodiment, a low haze polyimide film can be used in electronic device applications, such as in an organic electronic device. Organic electronic devices that may benefit from having one or more low haze polyimide layers include, but are not limited to, (1) devices that convert electrical energy into radiation (e.g., a light-emitting diode, light emitting diode display, lighting device, luminaire, or diode laser), (2) devices that detect signals through electronics processes (e.g., photodetectors, photoconductive cells, photoresistors, photoswitches, phototransistors, phototubes, IR detectors, biosensors), (3) devices that convert radiation into electrical energy, (e.g., a photovoltaic device or solar cell), (4) devices that convert light of one wavelength to light of a longer wavelength, (e.g., a down-converting phosphor device); and (5) devices that include one or more electronic components that include one or more organic semi-conductor layers (e.g., a transistor or diode). Other uses for low haze polyimide films can include memory storage devices, antistatic films, biosensors, electrochromic devices, solid electrolyte capacitors, energy storage devices such as a rechargeable battery, and electromagnetic shielding applications.

In one embodiment, a low haze polyimide film can act as a flexible replacement for glass in an electronic device, such as an organic electronic device, to form a flexible display device. Layers that may or may not be present in organic electronic devices include color filters, touch sensor panels, and/or cover sheets (also known as cover lenses or cover films). One or more of these layers, in addition to the substrates used within these layers or other parts of the device, may be made from the low haze polyimide films disclosed herein. In a specific embodiment, a low haze polyimide film can be used in a cover sheet for and electronic device.

In one embodiment, a cover sheet (cover lens or cover film) also includes a hard coat layer, an anti-reflection layer, or both a hard coat layer and anti-reflection layer. A hard coat, such as a siloxane or acrylate layer, or a nanoparticle composite layer, may be used on the surface of a low haze polyimide film to increase the surface hardness of the cover sheet, enabling the formation of a curved protective film that matches the profile of a curved display. The cover sheet must be moldable at relatively high temperatures, typically near or above the $T_g$ of the polyimide and able to maintain relatively high flexibility (that is, a relatively small bending radius) and a relatively high elongation-to-break, while maintaining sufficient hardness.

The advantageous properties of this invention can be observed by reference to the following examples that illustrate, but do not limit, the invention. All parts and percentages are by weight unless otherwise indicated.

EXAMPLES

Test Methods

Thermal Stability Testing of Polyimide Films and Color-Tuning Compounds

The cured polyimide films and pure color-tuning compounds were subjected to the same heating procedure for thermal stability testing.

For the polyimide films, the polyamic acid mixture was cast using a doctor blade with a 15 mil clearance (for ~1 mil cured films) and 30 mil clearance (for ~2 mil cured films) on a glass surface. The film was heated to 80° C. for 20 minutes and was subsequently lifted off the glass surface and mounted onto a 3×8 inch pin frame. For the pure color-tuning compounds, approximately 100 mg of the color-tuning compound was placed in a glass scintillation vial. The mounted films and glass vials were placed in a furnace (Thermolyne™ F6000 box furnace, Thermo Fisher Scientific, Inc., Waltham, Mass.).

In both cases, the furnace was purged with nitrogen and heated according to the following temperature protocol:
25 to 45° C. (5° C./min), hold at 45° C. for 5 minutes;
45 to 150° C. (20° C./min), hold at 150° C. for 10 minutes;
150 to 250° C. (20° C./min), hold at 250° C. for 10 minutes;
250 to 350° C. (20° C./min), hold at 350° C. for 5 minutes.
The scintillation vials were removed "hot" from the oven after heating to 350° C. for 5 minutes and allowed to cool in air. Compound stability was determined by visual inspection and by UV-Vis spectrophotometry. Films for all of the Examples and Comparative Examples were thermally stable to temperatures above 320° C.

Measurement of CIE L*, a*, b* Color

Color measurements were performed using a ColorQuest® XE dual-beam spectrophotometer (Hunter Associates Laboratory, Inc., Reston, Va.), using D65 illumination and 10 degree observer, in total transmission mode over a wavelength range of 380 to 780 nm.

UV-Vis Spectrophotometry

Color-tuning compounds were prepared for UV-Vis analysis by dissolving 5±1 mg in DMAc (Alfa Aesar, CAS-127-19-5; lot K02Y661). 2 ml of 1:10 dilution of the stock solutions in DMAc were aliquoted into 10 mm QS cuvettes and analyzed on a UV-visible scanning spectrophotometer (UV-1800, Shimadzu Corp., Japan). Analysis was done on a spectral scan mode ranging in wavelength from 200 to 900 nm.

Haze

Haze was measured using a Haze-Guard Plus (BYK-Gardner GmbH, Germany), with the haze measured in transmission by collecting forward scattered light using the method described by ASTM1003. Percent haze was determined by measuring the amount of light which deviates from the incident beam by more than 2.5 degrees on average.

Comparative Example 1

For Comparative Example 1 (CE1), a polyamic acid solution with a monomer composition of BPDA 0.6/6FDA 0.4//TFMB 1.0 (molar equivalents) was made in a large batch reactor. In a nitrogen purged 80-gallon reactor, 17,500 g of trifluoromethylbenzidine (TFMB, Seika Corporation, Wakayama Seika Kogyo Co., LTD., Japan) and 136,830 g of dimethyl acetamide (DMAc) were stirred and agitated. 9,406 g of biphenyl tetracarboxylic acid dianhydride (BPDA, Mitsubishi Chemical Co., Japan) and 9,468 g of 4,4'-(hexafluoroisopropylidene)diphthalic anhydride (6FDA, Synasia, Metuchen, N.J.) were added in four separate aliquots over a 6 hours period. The reaction mixture was maintained at ~40° C. during this procedure. Three additional aliquots of 15.520 g of BPDA and 15.622 g of 6FDA were added to the reaction mixture over a period of approximately 3 hours. The viscosity of the pre-polymer was ~100 poise.

A portion of the polymer was polymerized ("finished") to ~1700 poise using a mixture of 6 wt % pyromellitic dianhydride in DMAc in a nitrogen purged reactor. The material was polymerized with the PMDA solution over the course of ~24 hours at 40° C.

Comparative Examples 2 and 3

For Comparative Examples 2 and 3 (CE2 and CE3), a polyamic acid solution with a monomer composition of BPDA 0.6/6FDA 0.4//TFMB 1.0 (molar equivalents) was made in a lab-scale preparation. To a 500-ml liter nitrogen purged resin kettle, 60.47 g of TFMB was added to 381.70 g of DMAc solvent (HPLC grade, Honeywell, USA). 33.00 g of 6FDA and 32.86 g of BPDA were added in three aliquots over three 5- to 10-minute intervals. An additional 95.42 g of DMAc was added. The reaction mixture was held at 40° C. during these additions. The polymer was "finished" to ~400 poise using small additions of 6 wt % PMDA solution in DMAc.

The polymer was de-gassed using a centrifugal-planetary mixer (THINKY USA, Laguna Hills, Calif.) to force the gas from the pre-polymer at 2000 rpm for 5 minutes followed by 2200 rpm for 30 seconds. This procedure was repeated if further de-gassing of the polymer was needed.

Comparative Example 4

For Comparative Example 4 (CE4), a polyamic acid solution with a monomer composition of 6FDA 1.0//TFMB 1.0 (molar equivalents) was made in a lab-scale preparation.

To a 300-ml beaker purged in a nitrogen glove box, 16.875 g of TFMB (Seika, Japan) was added to 160.00 g of DMAc solvent (HPLC grade, Honeywell, USA). 23.125 g of 6FDA (Synasia, Japan) was added in a slow addition over a 30-minute period. The reaction stirred overnight at room temperature. The polymer was "finished" to ~2000 poise using small additions of 6 wt % PMDA solution in DMAc.

The polymer was de-gassed using the centrifugal-planetary mixer to force the gas from the pre-polymer at 2000 rpm for 5 minutes followed by 2200 rpm for 10 minutes. This procedure was repeated if further de-gassing of the polymer was needed.

Comparative Example 5

For Comparative Example 5 (CE5) a color-tuning compound slurry was prepared by first adding 20 g of polyamic acid to a 50-ml container. 100 g of DMAc and 0.06 g of pigment violet 29 (Paliogen® Red Violet K 5411, BASF Corp., Florham Park, N.J.) were then added to the container. The mixture was mixed for two minutes at 2000 rpm using a centrifugal-planetary mixer to create a 0.05 wt % slurry of the color-tuning compound mixture with polyamic acid and solvent.

For the preparation of the polymer/color-tuning compound composite, 100 g of polyamic acid, as described in CE2 was combined with 1 g of the color-tuning compound slurry described above. The mixture was agitated for two minutes at 2000 rpm using the centrifugal-planetary mixer. The mixture was then mixed for 10 minutes at 2200 rpm to degas the polymer/color-tuning compound composite. The calculated final loading of the color-tuning compound in the cured polymer was 23.8 ppm.

The polymer was cast using a stainless-steel drawdown bar. The clearance was adjusted using tape (Scotch® Filament tape 898, 3M Co., St. Paul, Minn.) to adjust the clearance. The polymer was cast on a glass surface. The film was heated to 85° C. for 15 minutes and was subsequently lifted off the glass surface and mounted onto an 8×10 inch pin frame.

The mounted film was placed in a furnace at 150° C., heated rapidly to 320° C. and then removed from the 320° C. oven and allowed to cool in air.

CE5 demonstrates that for this combination of low haze polyimide film and color-tuning compound, although using the color-tuning compound slightly improves the CIE L*, a*, b* color coordinates of the film, the loading of the color-tuning compound is too low to provide the desired color shift.

Examples 1 to 7

For Examples 1 to 7 (E1 to E7), the same procedure as described in CE5 was used, but with color-tuning compound loadings as shown in Table 2. E1 to E7 demonstrate that the CIE L*, a*, b* color coordinates of a low haze polyimide film can be optimized by adjusting the color-tuning compound loading.

Example 8

For Example 8 (E8), the same procedure as described in CE5 was used to make a polyamic acid composition of 6FDA 1.0//TFMB 1.0 (molar equivalents) with a color-tuning compound loading as shown in Table 2.

Example 9

For Example 9 (E9), the same procedure as described in E8 was used, but with a color-tuning compound loading as shown in Table 2. E8 and E9 demonstrate that for a 6FDA// TFMB film with pigment violet 29 (BASF), good films can be made at these loading levels.

Examples 10 to 14 and Comparative Example 6

For Examples 10 to 14 (E10 to E14) and Comparative Example 6 (CE6), using the polyamic acid of CE1 with pigment violet 23 (Sun Chemical Co., Parsippany, N.J.), the procedure as described in CE5 was used to prepare films having the color-tuning compound loadings as shown in Table 2. E10 to E14 and CE6 demonstrate that by adjusting both the color-tuning compound loading and the film thickness, the desired color shifts can be achieved in this film system.

Comparative Example 7

For Comparative Example 7 (CE7), a 0.05 wt % solution of zinc phthalocyanine (Sigma-Aldrich, Milwaukee, Wis.) was prepared by combining zinc phthalocyanine (0.0084 g) with dry N,N-dimethylacetamide (16.7916 g). The resulting mixture was roll milled until the color-tuning compound was completely dissolved.

A polyimide film containing 1000 ppm of zinc phthalocyanine was prepared by combining the polyamic acid solution described in CE3 (26.1768 g, 5.4971 g dry polymer) with a 0.05 wt % zinc phthalocyanine solution (10.8450 g). The polymer/color-tuning compound solution was mixed thoroughly using a the centrifugal-planetary mixer at 2000 rpm for 2 minutes. The mixture was then mixed for 2200 rpm for one minute to degas the polyamic acid mixture.

The polymer was cast using a doctor blade with a 15 mil clearance (for ~1 mil cured films) and 30 mil clearance (for ~2 mil cured films) on a glass surface. The film was heated to 80° C. for 20 minutes and was subsequently lifted off the glass surface and mounted onto a 3×8 inch pin frame.

Comparative Examples 8 to 12

For Comparative Examples 8 to 12 (CE8 to CE12), the same procedure as described in CE7 was used, but with color-tuning compound loadings as shown in Table 2.

Comparative Example 13

For Comparative Example 13 (CE13), the same procedure as described in CE7 was used, but using a boron subphthalocyanine compound. The polyimide film was prepared by combining the polyamic solution described in CE3 (24.8427 g, 5.2170 g dry polymer) with a 0.05 wt % boron subphthalocyanine chloride solution (1.0447 g). The calculated loading of the color-tuning compound in the cured polymer was 100 ppm.

Comparative Example 14

For Comparative Example 14 (CE14), the same procedure as described in CE7 was used, but using a quinacridone compound. The polyimide film was prepared by combining the polyamic solution described in CE3 (25.6795 g, 5.3927 g dry polymer) with a 0.05 wt % quinacridone solution (1.0786 g). The calculated loading of the color-tuning compound in the cured polymer was 100 ppm.

CE7 to CE14 demonstrate that simply incorporating compounds that absorb strongly in the upper range of the visible spectrum does not necessarily result in a film with the desired CIE L*, a*, b* color coordinates.

Examples 15 to 23

For Examples 15 to 23 (E15 to E23), using the polyamic acid of CE1 with pigment violet 29, the procedure as described in CE5 was used to prepare films having the color-tuning compound loadings as shown in Table 2. For E15 to E20, a color-tuning compound from Sigma-Aldrich was used, and for E21-E23 a color-tuning compound from Sun Chemical was used. E15 to E23 (along with E1 to E9) demonstrate that perylene compounds (pigment violet 29) with different particle sizes and morphologies impact the color-tuning compound loading needed to achieve desired CIE L*, a*, b* color coordinates. Pre-processing of the color-tuning compounds to modify their particle size and/or morphologies may result in improved performance.

TABLE 1

| Example | Color-Tuning Compound Absorption Max (nm) | Polymer | Color-Tuning Compound |
|---|---|---|---|
| CE1 | — | BPDA 0.6/6FDA 0.4//TFMB 1.0 | None |
| CE2 | — | BPDA 0.6/6FDA 0.4//TFMB 1.0 | None |
| CE3 | — | BPDA 0.6/6FDA 0.4//TFMB 1.0 | None |
| CE4 | — | 6FDA 1.0//TFMB 1.0 | None |
| CE5 | 502-590 | CE2 | BASF Violet 29 |
| E1 | 502-590 | CE2 | BASF Violet 29 |
| E2 | 502-590 | CE2 | BASF Violet 29 |
| E3 | 502-590 | CE2 | BASF Violet 29 |
| E4 | 502-590 | CE2 | BASF Violet 29 |
| E5 | 502-590 | CE2 | BASF Violet 29 |
| E6 | 502-590 | CE2 | BASF Violet 29 |
| E7 | 502-590 | CE2 | BASF Violet 29 |
| E8 | 502-590 | CE4 | BASF Violet 29 |
| E9 | 502-590 | CE4 | BASF Violet 29 |
| E10 | 530-630 | CE1 | Sun Violet 23 |
| E11 | 530-630 | CE1 | Sun Violet 23 |
| E12 | 530-630 | CE1 | Sun Violet 23 |
| E13 | 530-630 | CE1 | Sun Violet 23 |
| E14 | 530-630 | CE1 | Sun Violet 23 |
| CE6 | 530-630 | CE1 | Sun Violet 23 |
| CE7 | 604-658 | CE3 | zinc phthalocyanine |
| CE8 | 604-658 | CE3 | zinc phthalocyanine |
| CE9 | 604-658 | CE3 | zinc phthalocyanine |
| CE10 | 604-658 | CE3 | zinc phthalocyanine |
| CE11 | 604-658 | CE3 | zinc phthalocyanine |
| CE12 | 604-658 | CE3 | zinc phthalocyanine |
| CE13 | 564 | CE3 | Boron subphthalocyanine chloride |
| CE14 | 484-517 | CE3 | Quinacridone |
| E15 | 473-626 | CE1 | Sigma Violet 29 |
| E16 | 473-626 | CE1 | Sigma Violet 29 |
| E17 | 473-626 | CE1 | Sigma Violet 29 |
| E18 | 473-626 | CE1 | Sigma Violet 29 |
| E19 | 473-626 | CE1 | Sigma Violet 29 |
| E20 | 473-626 | CE1 | Sigma Violet 29 |
| E21 | 473-626 | CE1 | Sun Violet 29 |
| E22 | 473-626 | CE1 | Sun Violet 29 |
| E23 | 473-626 | CE1 | Sun Violet 29 |

TABLE 2

| Example | Color-Tuning Compound Loading (ppm) | Thickness (μm) | L* | a* | Δa* | b* | Δb* | % Haze |
|---|---|---|---|---|---|---|---|---|
| CE1 | 0 | 47 | 94.69 | −0.88 | — | 2.36 | — | 0.38 |
| CE2 | 0 | 29 | 94.80 | −0.77 | — | 2.07 | — | 0.41 |
| CE3 | 0 | 50 | 95.74 | −0.70 | — | 2.47 | — | 0.55 |
| CE4 | 0 | 29 | 95.23 | −0.43 | — | 1.22 | — | 0.43 |
| CE5 | 24 | 40 | 94.30 | −0.65 | 0.10 | 2.15 | 0.08 | 0.59 |
| E1 | 47 | 39 | 93.85 | −0.34 | 0.43 | 1.78 | −0.29 | 0.45 |
| E2 | 71 | 39 | 93.48 | −0.08 | 0.69 | 1.57 | −0.50 | 0.49 |
| E3 | 95 | 44 | 93.20 | 0.10 | 0.87 | 1.49 | −0.58 | 0.57 |
| E4 | 118 | 29 | 92.91 | 0.31 | 1.08 | 1.12 | −0.95 | 0.65 |
| E5 | 187 | 55 | 91.23 | 1.32 | 2.09 | 0.41 | −1.66 | 1.03 |
| E6 | 234 | 40 | 90.62 | 1.76 | 2.53 | −0.18 | −2.25 | 1.10 |
| E7 | 279 | 63 | 89.41 | 2.35 | 3.12 | −0.36 | −2.43 | 1.27 |
| E8 | 25 | 38 | 94.87 | −0.22 | 0.21 | 1.05 | −0.17 | 0.31 |
| E9 | 75 | 37 | 94.24 | 0.13 | 0.56 | 0.69 | −0.53 | 0.58 |

TABLE 2-continued

| Example | Color-Tuning Compound Loading (ppm) | Thickness (μm) | L* | a* | Δa* | b* | Δb* | % Haze |
|---|---|---|---|---|---|---|---|---|
| E10 | 24 | 45 | 94.07 | −0.57 | 0.31 | 1.72 | −0.64 | 0.36 |
| E11 | 47 | 38 | 93.65 | 0.18 | 1.06 | 0.96 | −1.40 | 0.48 |
| E12 | 71 | 47 | 92.80 | 0.26 | 1.14 | 0.12 | −2.24 | 0.58 |
| E13 | 24 | 39 | 94.18 | −1.06 | −0.18 | 2.04 | −0.32 | 0.30 |
| E14 | 47 | 30 | 93.94 | −0.93 | −0.05 | 1.30 | −1.06 | 0.38 |
| CE6 | 71 | 41 | 93.13 | −1.91 | −1.03 | 0.97 | −1.39 | 0.42 |
| CE7 | 1000 | 40 | 92.29 | −11.52 | −10.82 | −1.49 | −3.96 | 0.38 |
| CE8 | 500 | 44 | 93.85 | −6.58 | −5.88 | 0.53 | −1.94 | 0.43 |
| CE9 | 200 | 48 | 94.92 | −3.51 | −2.81 | 1.24 | −1.23 | 0.40 |
| CE10 | 100 | 48 | 95.30 | −1.91 | −1.21 | 1.98 | −0.49 | 0.47 |
| CE11 | 50 | 48 | 95.36 | −1.32 | −0.62 | 2.64 | 0.17 | 0.16 |
| CE12 | 5 | 49 | 95.46 | −0.83 | −0.13 | 3.36 | 0.89 | 0.19 |
| CE13 | 100 | 46 | 95.61 | −0.76 | −0.06 | 3.39 | 0.92 | 0.42 |
| CE14 | 100 | 45 | 95.23 | 0.04 | 0.74 | 3.30 | 0.83 | 0.43 |
| E15 | 141 | 38 | 93.55 | −0.52 | 0.36 | 2.03 | −0.33 | 1.49 |
| E16 | 187 | 43 | 93.43 | −0.43 | 0.45 | 2.03 | −0.33 | 1.87 |
| E17 | 234 | 38 | 93.35 | −0.26 | 0.62 | 1.70 | −0.66 | 2.10 |
| E18 | 280 | 40 | 92.85 | −0.09 | 0.79 | 1.58 | −0.78 | 3.28 |
| E19 | 325 | 37 | 92.70 | −0.02 | 0.86 | 1.59 | −0.77 | 3.50 |
| E20 | 370 | 38 | 92.47 | 0.08 | 0.96 | 1.43 | −0.93 | 3.72 |
| E21 | 49 | 45 | 94.39 | −0.68 | 0.20 | 2.43 | 0.07 | 0.31 |
| E22 | 74 | 41 | 94.30 | −0.59 | 0.29 | 2.36 | 0 | 0.35 |
| E23 | 99 | 43 | 94.09 | −0.48 | 0.40 | 2.40 | 0.04 | 0.27 |

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose.

Accordingly, the specification and figures are to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

When an amount, concentration, or other value or parameter is given as either a range, preferred range or a list of upper values and lower values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

What is claimed is:

1. A low haze polyimide film comprising:
   a polyimide derived from a dianhydride and a diamine; and
   a color-tuning compound comprising a perylene, wherein the low haze polyimide film has:
      a thickness in a range of from 1 to 150 μm;
      an a* closer to zero with a |Δa*| greater than 0.2 and a b* that is at most 0.2 further away from zero, or a b* closer to zero with a |Δb*| greater than 0.2 and an a* that is at most 0.2 further away from zero, when compared to a low haze polyimide film of the same dianhydride and diamine composition, but without the color-tuning compound; and
      a haze of less than 4%.

2. The low haze polyimide film of claim 1, wherein the dianhydride is selected from the group consisting of 3,3',4,4'-biphenyl tetracarboxylic dianhydride, pyromellitic dianhydride, cyclobutane dianhydride, 4,4'-(hexafluoroisopropylidene)diphthalic anhydride and mixtures thereof.

3. The low haze polyimide film of claim 1, wherein the dianhydride comprises a fluorinated dianhydride.

4. The low haze polyimide film of claim 3, wherein the fluorinated dianhydride comprises 4,4'-(hexafluoroisopropylidene)diphthalic anhydride.

5. The low haze polyimide film of claim 1, wherein the diamine comprises a fluorinated diamine.

6. The low haze polyimide film of claim 5, wherein the fluorinated diamine comprises 2,2'-bis(trifluoromethyl) benzidine.

7. The low haze polyimide film of claim 1, wherein the perylene is pigment violet 29.

8. The low haze polyimide film of claim 1, wherein the low haze polyimide film has an L* of greater than 90.

9. The low haze polyimide film of claim 1, wherein the low haze polyimide film has a thickness in a range of from 5 to 125 μm.

10. The low haze polyimide film of claim 1, wherein the color-tuning compound is present in the low haze polyimide film in an amount in the range of from 5 to 500 ppm.

* * * * *